(12) United States Patent
Humfeld et al.

(10) Patent No.: US 11,433,642 B2
(45) Date of Patent: Sep. 6, 2022

(54) COMPOSITE PANELING HAVING MULTIPLE FACESHEETS AND A CORE

(71) Applicant: The Boeing Company, Chicago, IL (US)

(72) Inventors: Keith Daniel Humfeld, Federal Way, WA (US); Scott Hartshorn, Snohomish, WA (US)

(73) Assignee: The Boeing Company, Chicago, IL (US)

(*) Notice: Subject to any disclaimer, the term of this patent is extended or adjusted under 35 U.S.C. 154(b) by 145 days.

(21) Appl. No.: 15/953,144

(22) Filed: Apr. 13, 2018

(65) Prior Publication Data
US 2019/0315091 A1  Oct. 17, 2019

(51) Int. Cl.
*B32B 7/05* (2019.01)
*B22D 19/00* (2006.01)
(Continued)

(52) U.S. Cl.
CPC ............... *B32B 7/05* (2019.01); *B22D 19/00* (2013.01); *B29D 99/0021* (2013.01); *B32B 5/26* (2013.01); *B32B 15/01* (2013.01); *B64C 1/00* (2013.01); *B32B 2250/02* (2013.01); *B32B 2250/24* (2013.01); *B32B 2260/046* (2013.01); *B32B 2262/106* (2013.01); *B32B 2605/18* (2013.01); *B64C 2001/0072* (2013.01)

(58) Field of Classification Search
CPC ............... B22D 19/00; B32B 2605/18; B32B 2262/106; B32B 5/26; B32B 7/05; B64C 1/00; B64C 2001/0072; B29C 70/28; B29C 70/30; B29C 70/40; B29C 70/205; B29C 70/44; B29C 44/146; B29C 51/10; B29C 51/105; B29C 51/20; B29C 51/267; B29C 51/36; B29C 44/143; B29C 33/14; B29C 33/18; B29C 2791/006; Y10T 156/1003; Y10T 156/1002; Y10T 156/1028; Y10S 264/78; B29D 99/001; B29D 99/0021
USPC ..... 264/45.4, 46.6, 46.8, 295, 296; 428/124, 428/126, 304.4, 318.4, 318.6
See application file for complete search history.

(56) References Cited

U.S. PATENT DOCUMENTS 2,502,304 A * 3/1950 Baker ..................... C08J 9/00
264/164
2,955,972 A * 10/1960 Wintermute .......... B29C 44/146
156/79

(Continued)

FOREIGN PATENT DOCUMENTS

DE    3126242 A1 *  1/1983  ............. B29B 11/16
DE    3126242 A1     1/1983

OTHER PUBLICATIONS

Machine translation of description for DE-3126242, Jan. 1983.*
(Continued)

*Primary Examiner* — Philip C Tucker
*Assistant Examiner* — Jimmy R Smith, Jr.
(74) *Attorney, Agent, or Firm* — Duft & Bornsen, PC (57) ABSTRACT

Systems and methods are provided for fabricating composite parts. One embodiment is a method of forming a composite part. The method includes laying up opposing composite facesheets, placing a viscous material between the facesheets, increasing a distance between the facesheets, and solidifying the facesheets and the viscous material into an integral composite part.

22 Claims, 12 Drawing Sheets

(51) Int. Cl.
    *B32B 5/26*     (2006.01)
    *B32B 15/01*     (2006.01)
    *B64C 1/00*     (2006.01)
    *B29D 99/00*     (2010.01)

(56) References Cited

U.S. PATENT DOCUMENTS

| | | | | |
|---|---|---|---|---|
| 2,962,409 | A * | 11/1960 | Ludlow | B21D 47/00 264/259 |
| 3,097,982 | A * | 7/1963 | Stoner | B64C 3/00 156/211 |
| 3,215,583 | A * | 11/1965 | Holme | B29C 70/12 428/86 |
| 4,172,916 | A * | 10/1979 | Watson | B32B 5/16 428/86 |
| 6,440,353 | B1 * | 8/2002 | Hutchins | B29C 49/0047 264/138 |
| 9,283,895 | B2 | 3/2016 | Sumi et al. | |
| 2015/0174874 | A1 * | 6/2015 | Patel | B32B 37/02 156/73.1 |
| 2015/0175801 | A1 | 6/2015 | Kim | |
| 2015/0367619 | A1 * | 12/2015 | Butler | B32B 37/142 428/57 |
| 2016/0144576 | A1 * | 5/2016 | Cordner | B29C 67/20 428/138 |

OTHER PUBLICATIONS

The Physics Hypertextbook—Viscosity by Glenn Elert, 2021, downloaded Sep. 22, 2021 from https://physics.info/viscosity/.*
European Search Report; Application EP19163328; dated Oct. 8, 2019.
U.S. Appl. No. 15/877,628, filed Jan. 23, 2018, Keith Daniel Humfeld, Federal Way, WA (US) Scott Hartshorn, Snohomish, WA (US).

* cited by examiner

COMPOSITE PANELING HAVING MULTIPLE FACESHEETS AND A CORE

FIELD

The disclosure relates to the field of composites, and in particular, to composite materials.

BACKGROUND

Composite facesheets may be placed on opposite sides of a core material in order to provide a combined composite part with desired aerodynamic, thermal, and/or structural properties. For example, a honeycomb-shaped core may be placed between two composite facesheets to form a combined composite part that is glued together and sculpted to a desired shape. The core provides structural strength, and also provides reduced weight because it weighs less by volume than the facesheets. Hence, the combination of facesheets and core remains lighter than a structure fabricated purely from a composite laminate. The core separates the face sheets while ensuring that composite material of the facesheets is placed at desired locations. However, core materials are created via separate fabrication processes than the facesheets themselves, and assembly of the combined composite part also requires substantial amounts of time, skill and labor.

Therefore, it would be desirable to have a method and apparatus that take into account at least some of the issues discussed above, as well as other possible issues.

SUMMARY

Embodiments described herein provide for combined composite parts that include cured tendrils of material that form a core between multiple facesheets. The tendrils of material provide structural strength, and may be separated by gaps in order to reduce the weight of the core. These tendrils of material may be made from the same type of resin as used for the facesheets, and hence may be cured at the same time as the facesheets. This saves time and labor involved in fabricating combined composite parts. One embodiment is a method of forming a composite part. The method includes laying up opposing composite facesheets, placing a viscous material between the facesheets, increasing a distance between the facesheets, and solidifying the facesheets and the viscous material into an integral composite part.

A further embodiment is a method that includes placing a viscous material in contact with a first surface of a first facesheet, placing the viscous material in contact with a second surface of a second facesheet that faces the first surface such that the viscous material is sandwiched between the first facesheet and the second facesheet, drawing the second surface from the first surface in a direction away from the first surface, and solidifying the viscous material while tendrils of the viscous material remain in contact with both the first surface and the second surface.

A further embodiment is a non-transitory computer readable medium embodying programmed instructions which, when executed by a processor, are operable for performing a method. The method includes placing a viscous material in contact with a first surface of a first facesheet, placing the viscous material in contact with a second surface of a second facesheet that faces the first surface such that the viscous material is sandwiched between the first facesheet and the second facesheet, drawing the second surface from the first surface in a direction away from the first surface, and solidifying the viscous material while portions of the viscous material remain in contact with both the first surface and the second surface.

A further embodiment is a manufacture that includes a first facesheet of fiber-reinforced polymer forming a first surface of the manufacture, a second facesheet of fiber-reinforced polymer forming a second surface of the manufacture, and tendrils of material disposed between the first facesheet and the second facesheet that contact the first surface and the second surface such that the tendrils are sandwiched between the first facesheet and the second facesheet.

A further embodiment is a method that includes forming a core between facesheets by: placing a viscous material in contact with a first surface of a first of the facesheets, placing the viscous material in contact with a second surface of a second of the facesheets that faces the first surface such that the viscous material is sandwiched between the first facesheet and the second facesheet, drawing the second surface away from the first surface in a direction perpendicular to the first surface; and solidifying the viscous material while tendrils of the viscous material remain in contact with both the first surface and the second surface.

A further embodiment is a method that includes laying up opposing composite facesheets, adding a core material between the facesheets, making the core material viscous, and reducing the fraction of a volume between the facesheets that is filled by the core material between the facesheets.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
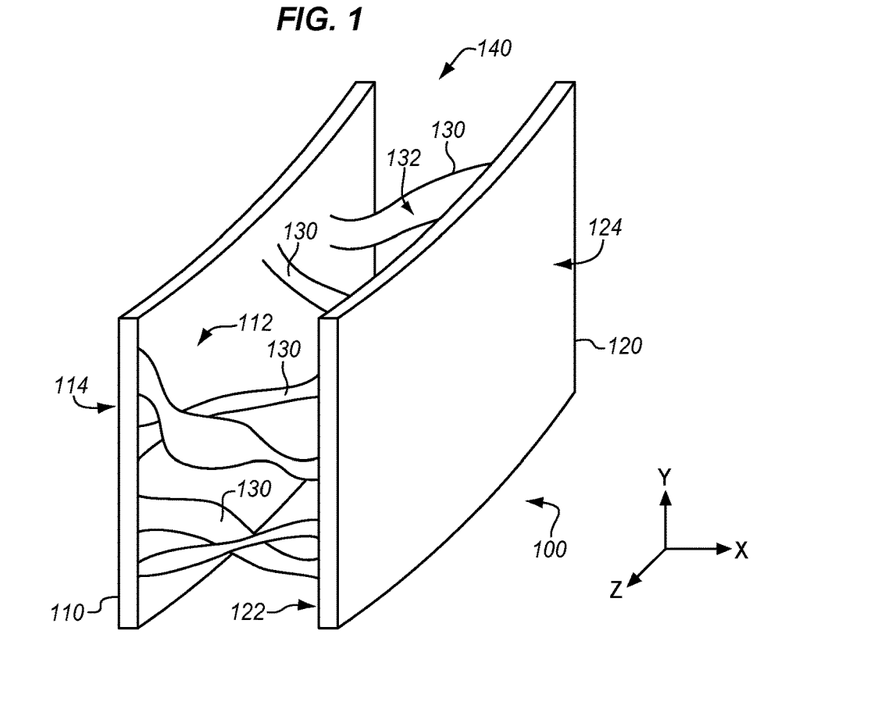
FIG. 1 is a perspective view of a composite part that includes multiple facesheets that are structurally coupled by tendrils of cured resin in an illustrative embodiment.
Figure 2:
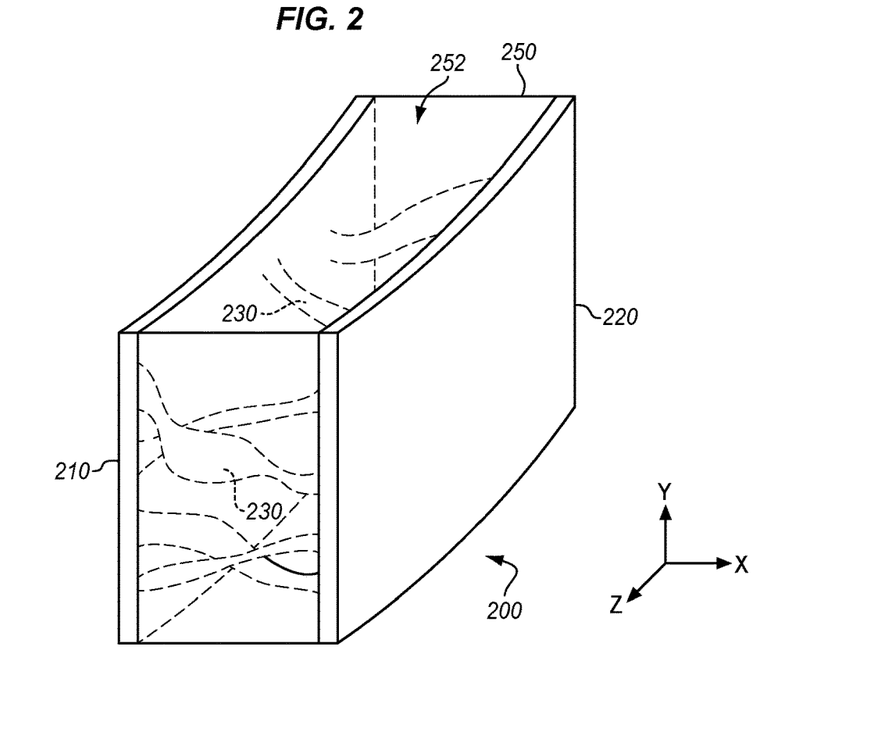
FIG. 2 is a perspective view of a composite part that includes a volume-filling foam in an illustrative embodiment.

FIG. 1 is a perspective view of a composite part 100 that includes multiple opposing facesheets that are structurally coupled by tendrils 130 of resin 132 that has been cured in an illustrative embodiment. As shown in FIG. 1, tendrils 130 structurally couple the surface 112 of facesheet 110 with the surface 122 of facesheet 120. Tendrils 130 may also be referred to as "bridges" or "portions." Outer surface 114 of facesheet 110, and outer surface 124 of facesheet 120, are also illustrated. Tendrils 130 impart a desired level of structural strength to composite part 100, while still providing a volume 140 of empty space that reduces the weight of composite part 100. Phrased another way, tendrils 130 operate as a core or core material that provides a means to separate the facesheets and place solid laminate where needed to provide the desired structural strength. For example, tendrils 130 enhance the shear strength of composite part 100 with respect to forces that would separate facesheet 110 from facesheet 120, while leaving substantial amounts of empty space between the facesheets. Facesheet 110 and facesheet 120 may comprise carbon fiber facesheets, or other composite materials. Resin 132 may comprise a thermoset or thermoplastic resin, or even a metal. Examples may include a polyether ether ketone (PEEK) resin, an epoxy amine resin, a bismaleimide resin, etc. In further embodiments the volume 140 may be filled with a structural or space-filling foam. FIG. 2 illustrates such an embodiment.

FIG. 2 is a perspective view of a composite part 200 that includes a volume-filling foam in an illustrative embodiment. According to FIG. 2, composite part 200 includes facesheet 210 and facesheet 220, which are structurally united via tendrils 230. A volume 250 of foam 252 fills space between the tendrils 230. The foam 252 may, for example, support the tendrils 230. In further embodiments, the foam 252 may provide thermal or aural insulation. The foam 252 may even perform other desired roles. Foam 252 may comprise a high-temperature foam, a closed cell polyurethane foam sealant, or other type of foam.

Illustrative details of the fabrication of composite part 100 will be discussed with regard to FIG. 3. Assume, for this embodiment, that a user has laid-up two facesheets of uncured composite material, such as Carbon Fiber Reinforced Polymer (CFRP) having a thermoset resin.

Figure 3:
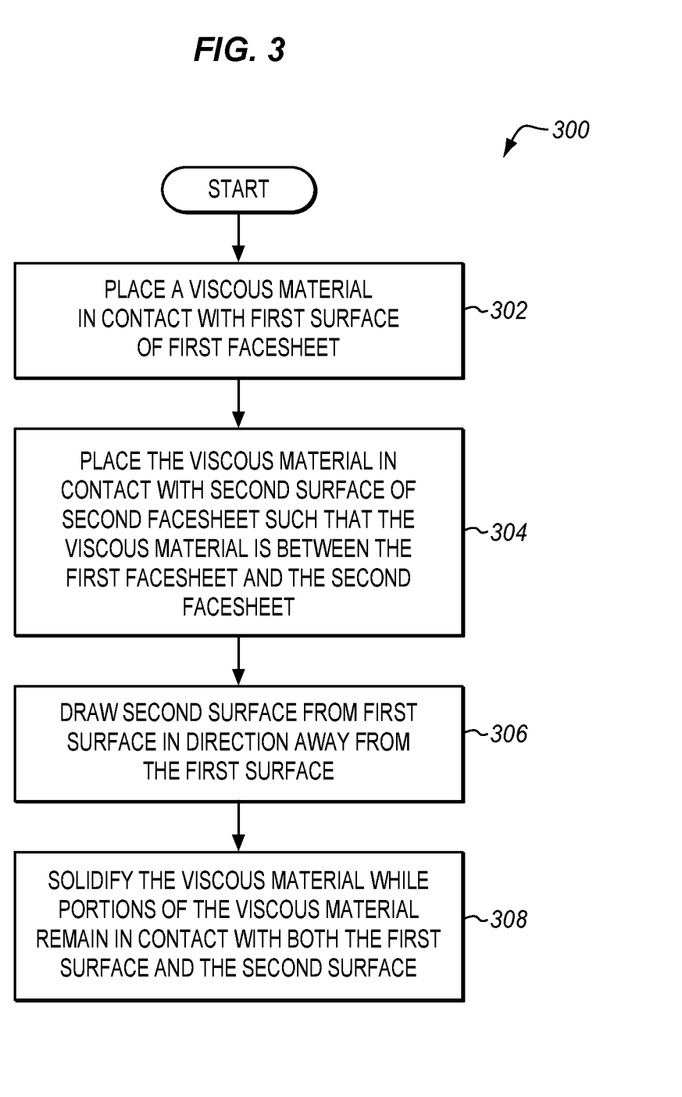
FIG. 3 is a flowchart illustrating a method for fabricating a composite part in an illustrative embodiment.

FIG. 3 is a flowchart illustrating a method 300 for fabricating a composite part 100 in an illustrative embodiment. The steps of method 300 are described with reference to composite part 100 of FIG. 1, but those skilled in the art will appreciate that method 300 may be performed in other systems and for other composite parts as desired. The steps of the flowcharts described herein are not all inclusive and may include other steps not shown. The steps described herein may also be performed in an alternative order.

According to method 300, a viscous material (e.g., resin 132, a molten metal, etc.) is placed into contact with surface 112 of a first facesheet (i.e., facesheet 110) (step 302), and the viscous material (i.e., the same viscous material as previously mentioned) is placed into contact with surface 122 of a second facesheet (i.e., facesheet 120) (step 304). Surface 122 faces the surface 112, so the viscous material is placed between (e.g., sandwiched between) facesheet 110 and facesheet 120. The viscous material is "viscous" in that when it is heated to a curing temperature (or other fabrication temperature for composite part 100), it enters a viscous phase (e.g., having a viscosity between one thousand and ten thousand centipoise). Hence, at room temperature, the viscous material may remain tacky, waxy, or even solid. The viscous material may be added by flowing the viscous material as a liquid between the facesheets, or by inserting a solid charge of the viscous material between the facesheets, at a temperature at which the viscous material remains solid. An entirety of the space between the facesheets may be filled with the viscous material, or the viscous material may be placed at locations where tendrils 130 are desired to form at composite part 100. The facesheets themselves may already be infused with the viscous material, or may comprise dry fiber that receives the viscous material during fabrication. The viscous material may also be referred to herein as a "core material."

The viscous material may be heated to a desired temperature where it exhibits the levels of viscosity discussed above (i.e., to a temperature where it is made viscous). For example, the viscous material may be heated to a curing temperature. If the viscous material is a metal or thermoplastic resin, it may be heated to a melting temperature. Method 300 further comprises drawing surface 122 from surface 112 in a direction away from surface 112 (e.g., perpendicular to surface 112, such as along the positive X direction of FIG. 1) (step 306). This action increases the distance between surface 122 and surface 112, and reduces the percentage of volume between surface 112 and surface 122 that is occupied by the viscous material, resulting in tendrils 130 of resin 132. The final percentage concentration by volume of the viscous material may, for example, be between thirty three and forty percent, or a suitable percentage at or above ten percent. In this manner, the amount of empty volume between the facesheets is increased. The distance between facesheet 110 and facesheet 120 during this process may, for example, increase by between one hundred and fifty and two hundred and fifty percent, and the final distance between facesheet 110 and facesheet 120 may for example be up to two inches (e.g., up to one inch). These tendrils 130 form a core between complex contoured facesheets, and even between contoured facesheets that are not parallel with each other, all without sacrificing structural strength.

During this process, facesheet 110 and facesheet 120 made be formed into a desired shape. Furthermore, suction may be applied to remove air in order to change the shape, and/or air may be supplied between the facesheets in order to change the shape.

The viscous material is further solidified while tendrils 130 remain in contact with both the surface 112 and the surface 122 (step 308). For example, the viscous material may be heated to a curing temperature, along with facesheet 110 and facesheet 120, in order to solidify the facesheets and the viscous material into an integral composite part having volume 140. In embodiments where the viscous material comprises a molten metal or thermoplastic, it may be cooled below its melt temperature into a solid state. After fabrication has been completed, a foam (e.g., a structural, expanding closed-cell foam) or an aerogel may be sprayed into the resulting composite part in order to fill volume 140 if desired.

Figure 4:
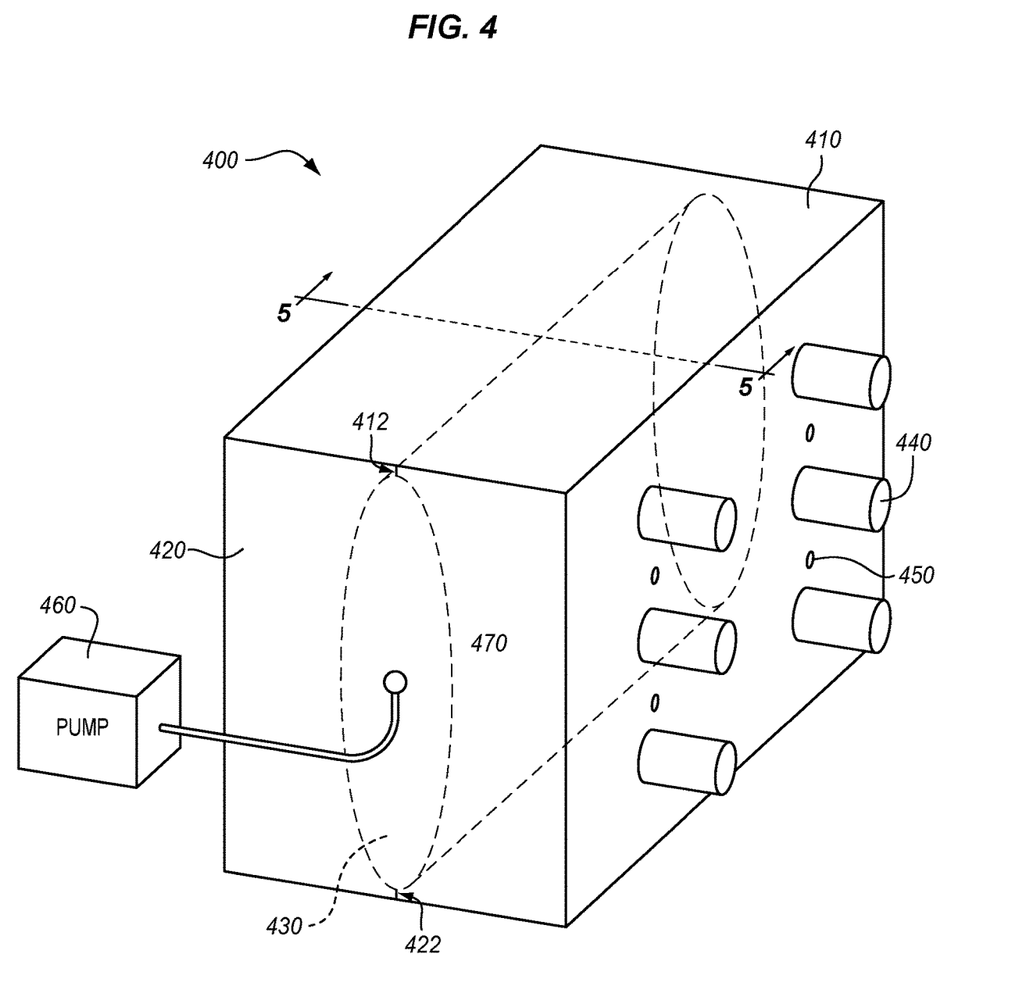
FIG. 4 is a perspective view of an enclosed tool for fabricating a composite part in an illustrative embodiment.

FIG. 4 is a perspective view of an enclosed tool 400 for fabricating a composite part in an illustrative embodiment. As shown in FIG. 4, enclosed tool 400 is formed from part 410 and part 420, which together mate to define a volume 430 that is internal to enclosed tool 400. Seam 412 and seam 422 between part 410 and part 420 are also depicted.

FIG. 4 further illustrates pistons 440 which slide into enclosed tool 400, as well as vacuum ports 450, which may apply suction to volume 430 of enclosed tool 400 during fabrication. For example, vacuum ports 450 may apply one pound per square inch (psi) of vacuum during fabrication. FIG. 4 also illustrates an inflation port 470 and pump 460, which may be utilized to pump air between facesheets in certain embodiments.

Figure 5:
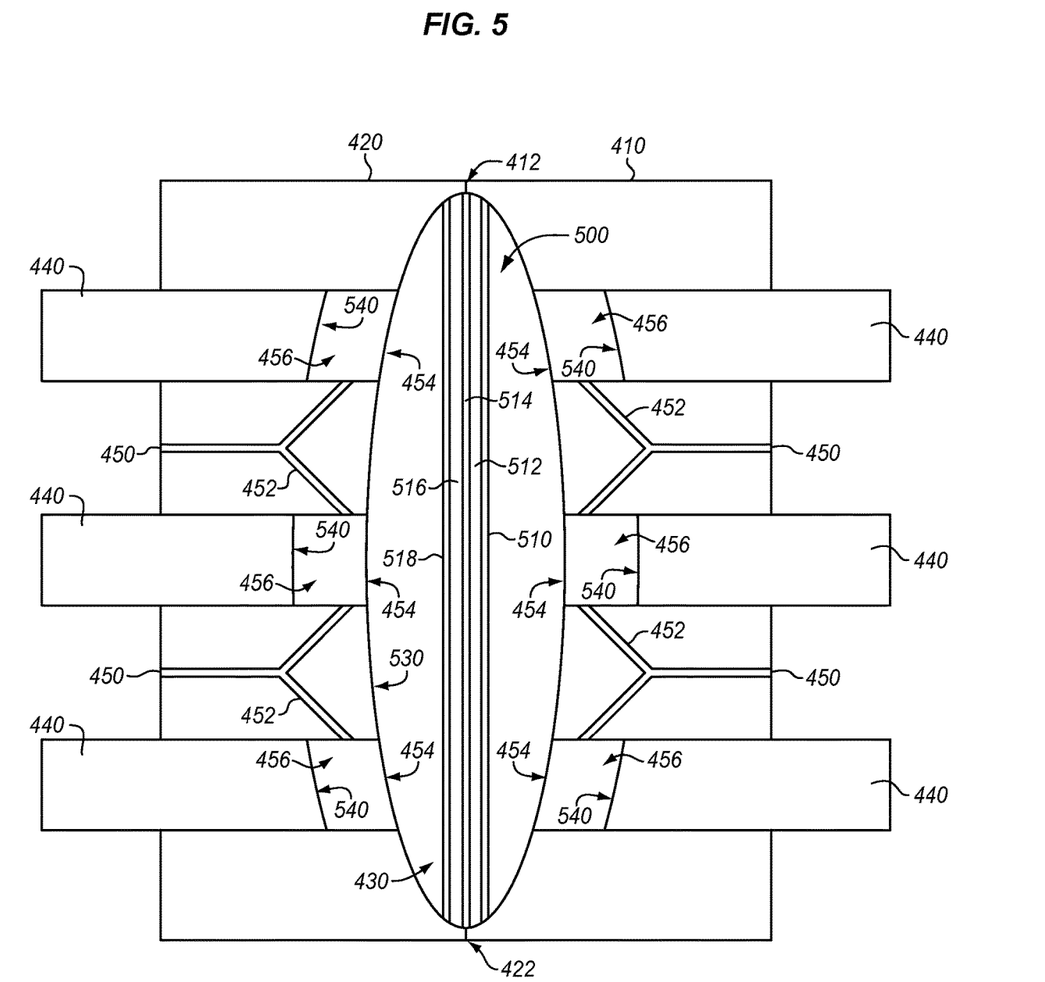
FIGS. 5-7 are cut-through views of the enclosed tool of FIG. 4 in an illustrative embodiment.
Figure 6:
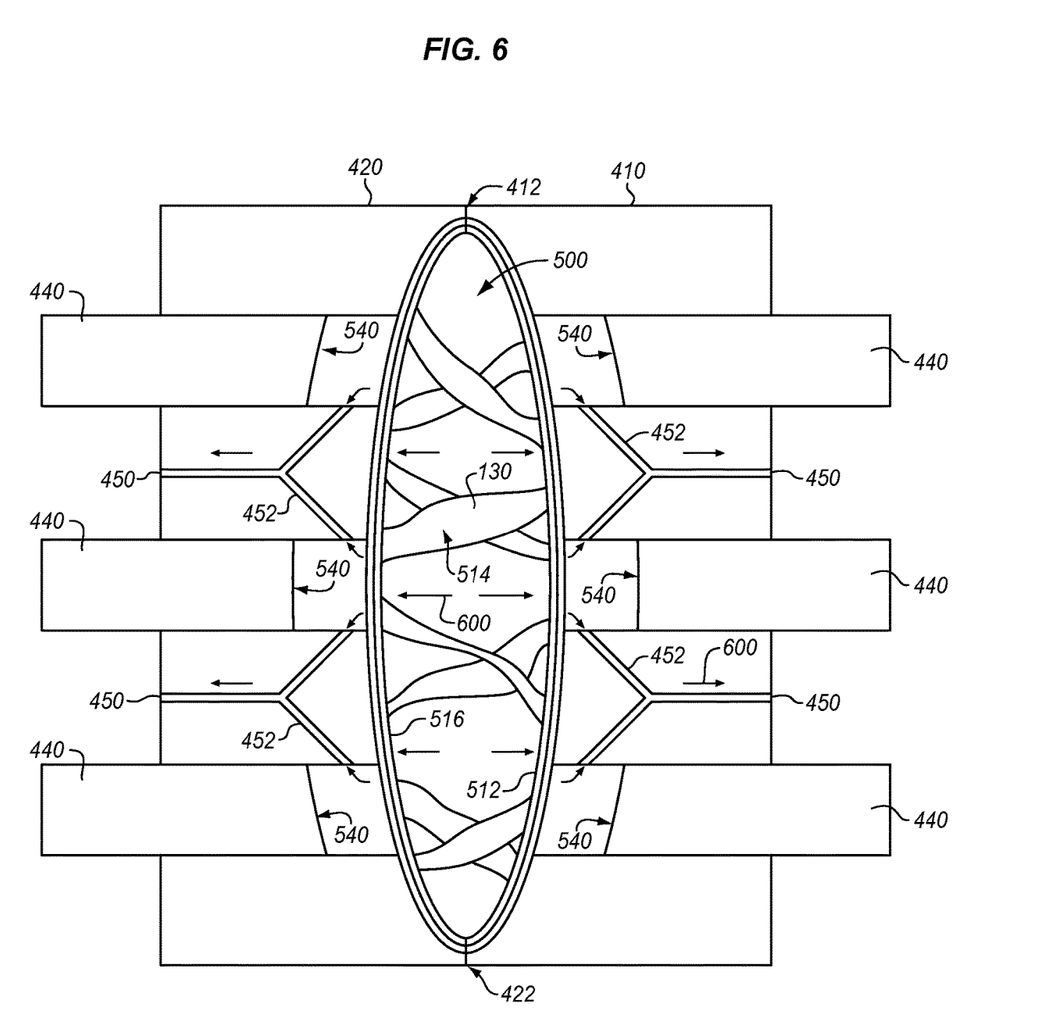
Figure 7:
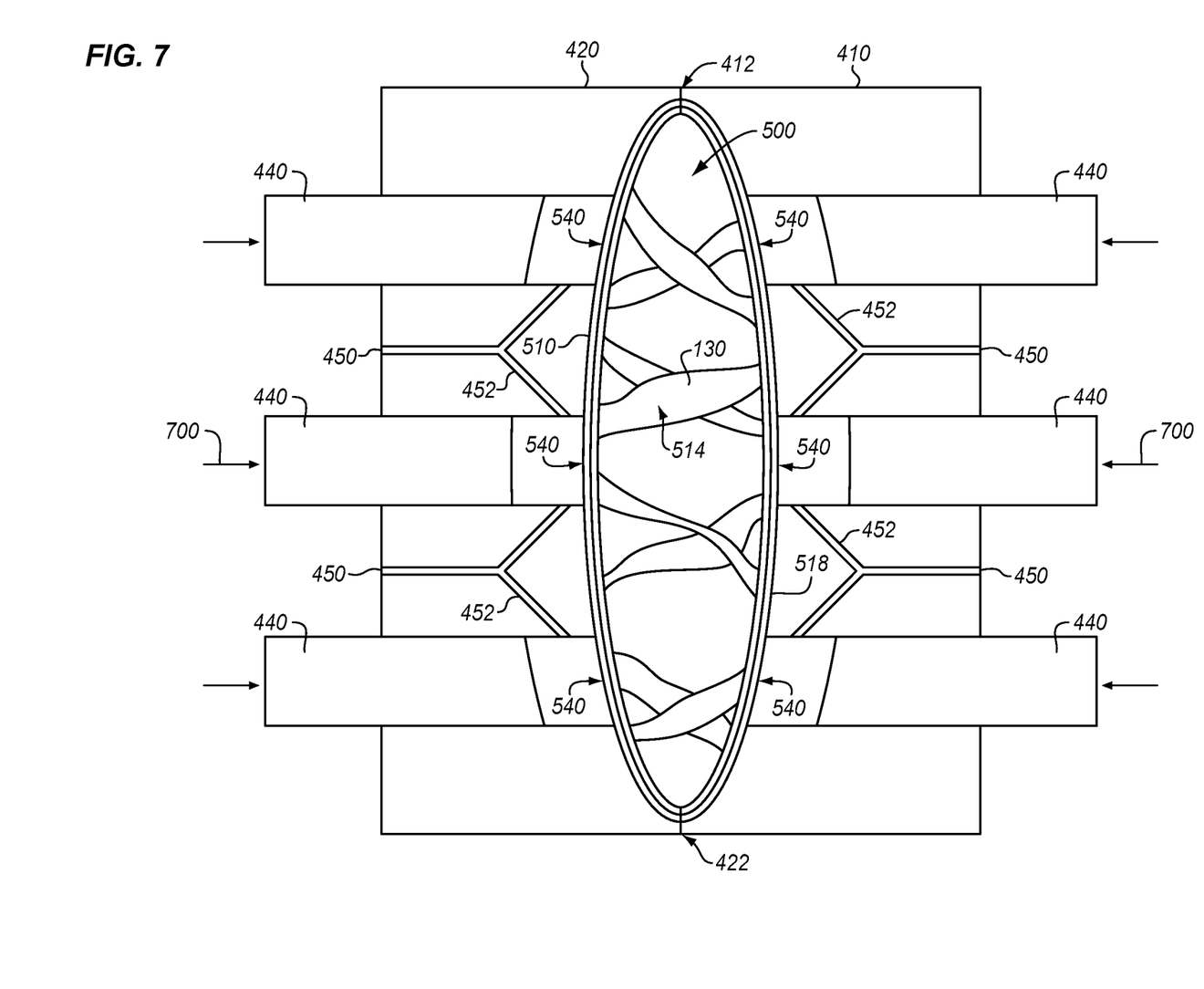

FIGS. 5-7 are cut-through views of the enclosed tool of FIG. 4 in an illustrative embodiment. Specifically, FIGS. 5-7 correspond with view arrows 5 of FIG. 4. According to FIG. 5, laminate 500 of uncured carbon fiber is laid-up within volume 430, and includes facesheets 512 and 516, which are separated by viscous material 514 (e.g., a curable resin). Laminate 500 may form, for example, a desired airfoil shape formed by facesheets 512 and 516. A layer 510 and a layer 518 of Fluorinated Ethylene Propylene (FEP) are also included, although in further embodiments the layer 510 and layer 518 may be used as an alternative to pistons 440. In still further embodiments, facesheets 512 and 516 need not be parallel, and may be separated by a viscous material 514 that changes in thickness (e.g., according to a curve).

FIG. 5 also illustrates that volume 430 includes surface 530, and that pistons 440 includes surfaces 540 that match surface 530. When pistons 440 are in an open position as shown in FIG. 5, air may be drawn outward from volume 430 via openings 454. The air enters chambers 456, via openings 454, and exits chambers 456 via channels 452 for vacuum ports 450. If desired, air may also or alternatively be supplied between the facesheets via inflation port 470 (shown on FIG. 4). In embodiments where pistons 440 are not used, layer 510 and layer 518 of FEP may absorb any "pinch" in material caused by suction from the vacuum ports.

FIG. 6 depicts the laminate 500 after suction has been applied via vacuum ports 450. The suction draws air out as indicated by arrows 600, which increases a distance between facesheet 512 and facesheet 516 and conforms them with surface 530 to form a desired shape (e.g., a complex contour). This causes viscous material 514 to form tendrils 130. With laminate 500 drawn into a desired shape, FIG. 7 illustrates that pistons 440 are driven to a closed position according to arrows 700 to provide mechanical support, cut off vacuum ports 450, and ensure conformance of laminate 500 with a desired shape during curing. With pistons 440 in a closed position, surfaces 540 of pistons 440 are flush with surface 530. Hence, no wrinkling or other distortion of the facesheets will occur during curing because a uniform curing surface is provided. In embodiments where layer 510 and layer 518 are used, pistons 440 may be optionally omitted, as layer 510 and layer 518 will absorb any "pinch" from applied suction that would otherwise draw fabric or material at a facesheet into locations where vacuum is applied.

Figure 8:
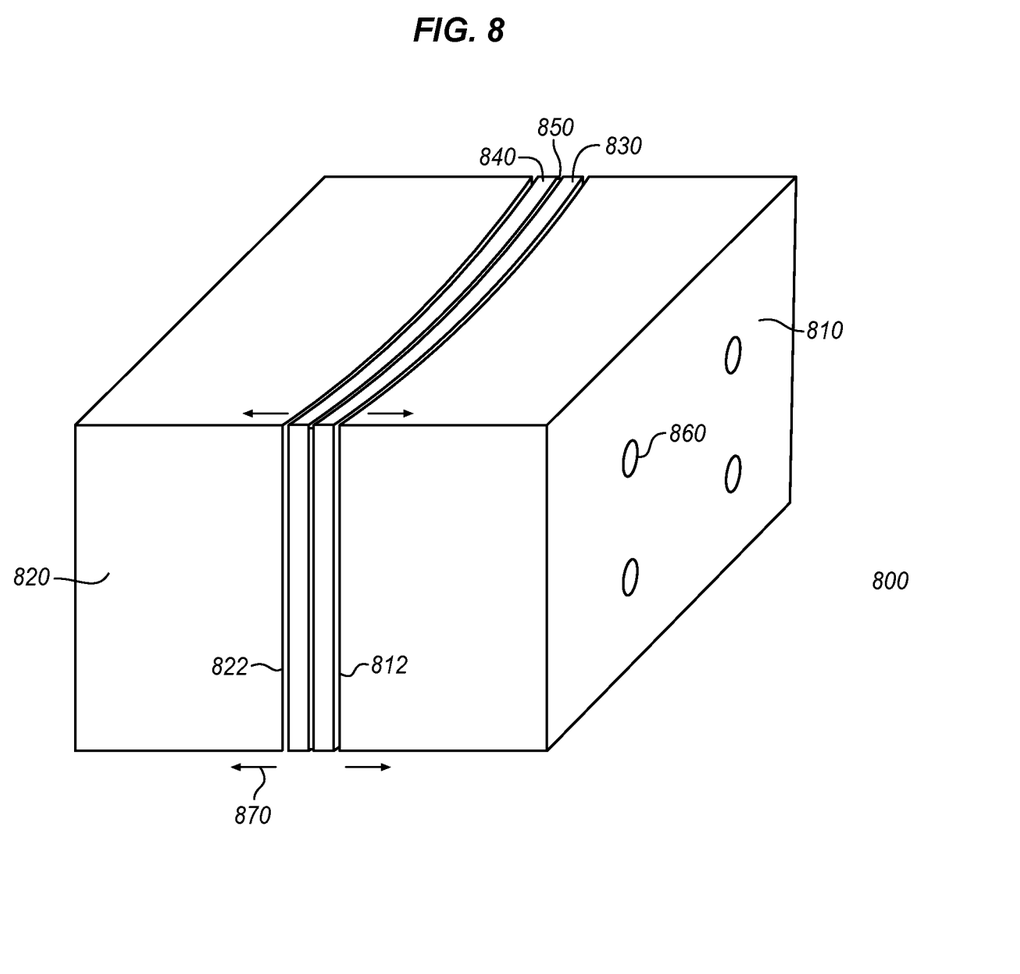
FIGS. 8-10 are perspective views of an open tool fabricating a composite part in an illustrative embodiment.
Figure 9:
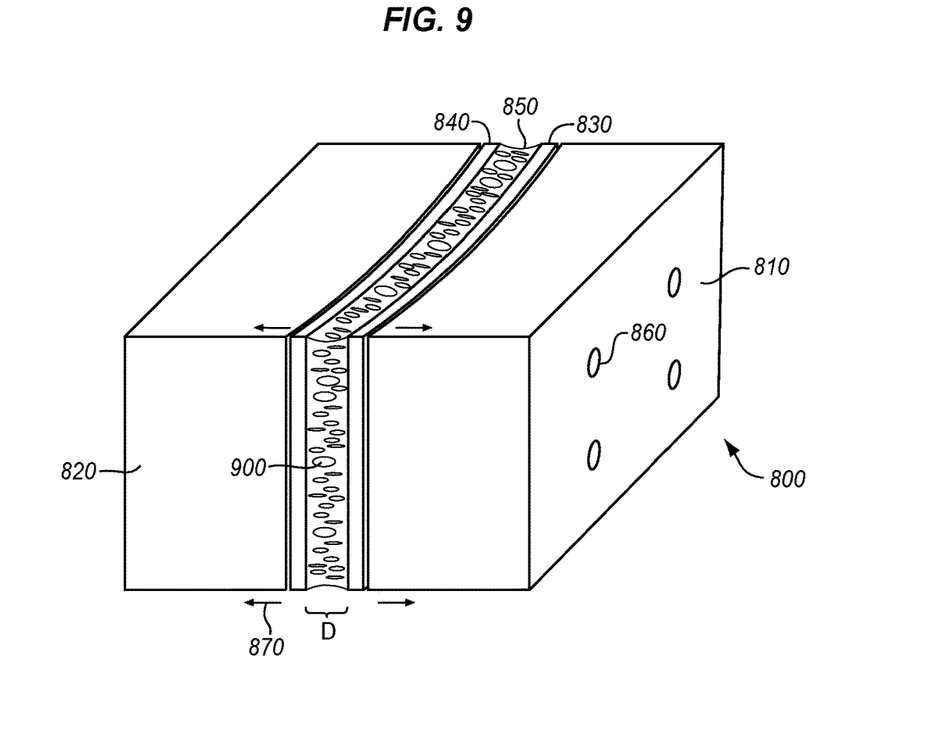
Figure 10:
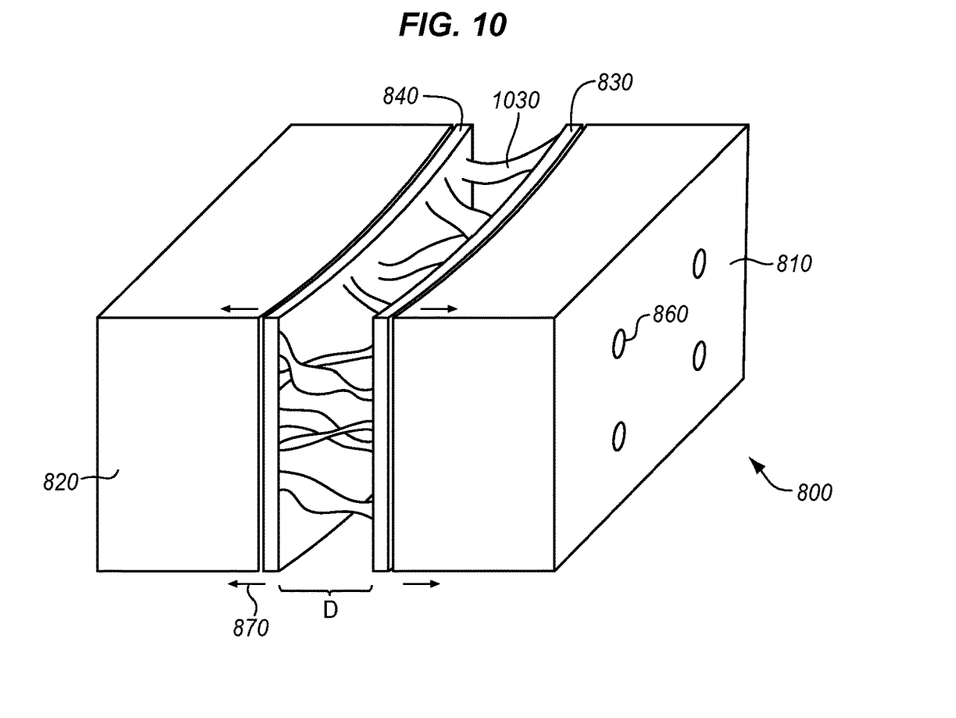

FIGS. 8-10 are perspective views of an open tool 800 fabricating a composite part in an illustrative embodiment. In this embodiment, open tool 800 is formed from part 810 and part 820, each of which includes vacuum ports 860. Suction drawn via vacuum ports 860 secures the facesheet 830 to surface 812 of part 810, and secures the facesheet 840 to surface 822 of part 820. Surface 812 and surface 822 both form complex contours. A film 850 of resin is placed/inserted between facesheet 830 and facesheet 840. Part 810 and part 820 are then drawn apart from each other as indicated by arrows 870. As shown in FIG. 9, as distance D increases, empty pockets 900 start to form in film 850, which is being pulled apart. When distance D reaches a desired amount, tendrils 1030 (also referred to herein as "bridges") of resin have been formed between the facesheets as shown in FIG. 10. In further embodiments, pumps or reservoirs of air may be utilized to ensure that as distance D increases, a vacuum is not formed between facesheet 830 and facesheet 840. Air may also be added between tendrils 130 to fill any resultant voids formed by separation of the facesheets.

Figure 11:
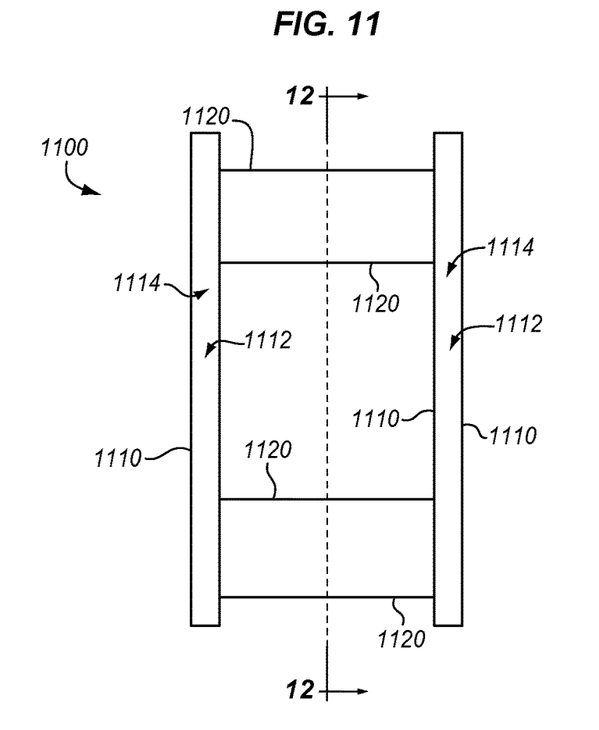
FIG. 11 is a front view of an insertable film of resin in an illustrative embodiment.
Figure 12:
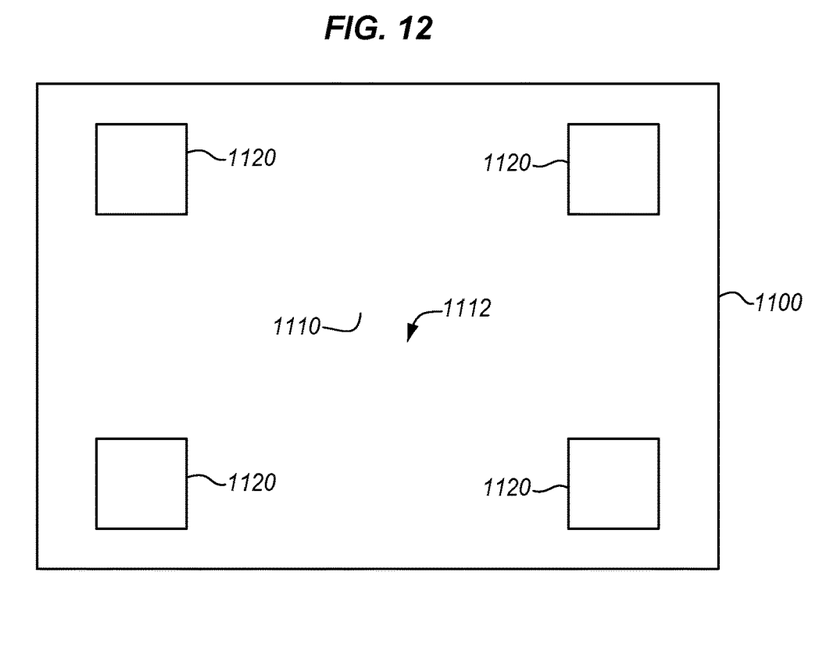
FIG. 12 is a cut-through view of an insertable film of resin in an illustrative embodiment.

FIG. 11 is a front view of a film 1100 of resin in an illustrative embodiment. According to FIG. 11, film 1100 includes wafers 1110 of resin 1112, and bridges 1120 of resin 1112. Wafers 1110 will contact facesheets of composite material when film 1100 is placed between the facesheets. Each wafer 1110 may include a matrix 1114 of material. This material may be a sacrificial material that provides structural support for resin 1112 but then melts during curing, such as a low melt temperature polymer or a wax. Alternatively, the matrix 1114 of material may be designed to remain rigid during curing and become part of the resulting composite part. Bridges 1120 may be placed at specifically desired locations along wafer 1110 in order to provide a desired level of shear stiffness for the resulting composite part, as shown in FIG. 12. Any suitable number and size of bridges 1120 may be used.

EXAMPLES

In the following examples, additional processes, systems, and methods are described in the context of a system that fabricates composite parts.

Figure 13:
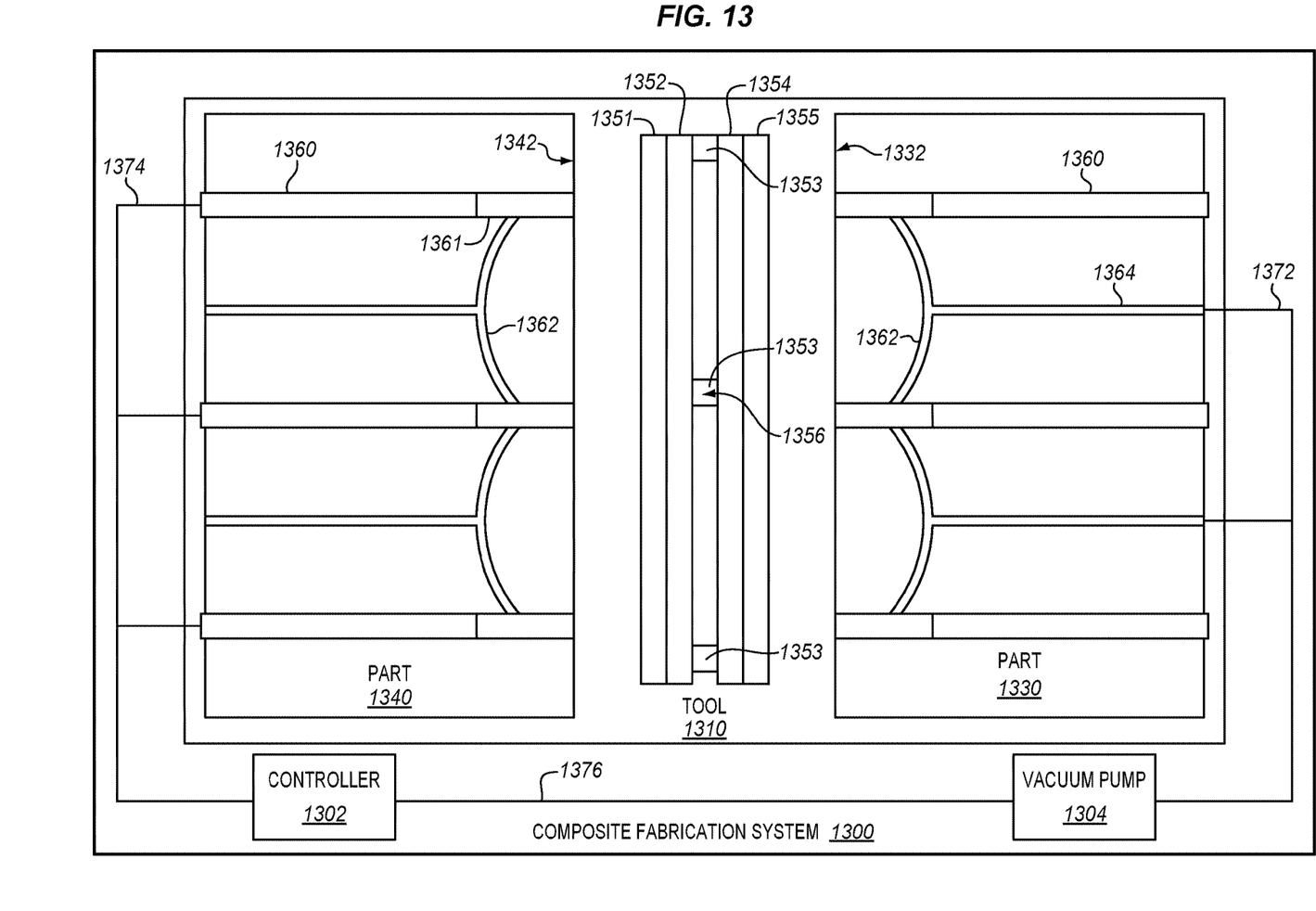
FIG. 13 is a block diagram illustrating a tool for fabricating a composite part in an illustrative embodiment.

FIG. 13 is a block diagram of a composite fabrication system 1300 in an illustrative embodiment. As shown in FIG. 13, composite fabrication system 1300 includes controller 1302, which manages the operations of vacuum pump 1304 via communication channel 1376 (e.g., a wired interface), and also manages pistons 1360 via communication channel 1374 (e.g., a wired interface). Controller 1302 may be implemented, for example, as custom circuitry, as a hardware processor executing programmed instructions, or some combination thereof. Vacuum pump 1304 applies suction to vacuum ports 1364 via vacuum channels 1372. This causes air to exit the tool 1310 via channels 1362.

Tool 1310 includes part 1330 and part 1340. Part 1340 includes surface 1342, while part 1330 includes surface 1332. Layer 1355 of FEP and layer 1351 of FEP are held to surface 1342 and surface 1332 respectively by suction applied via vacuum ports 1364. Facesheet 1352 and facesheet 1354 are separated by bridges 1353 of viscous material 1356. During operation, part 1330 and part 1340 are drawn away from each other in a direction perpendicular to surface 1332 and surface 1342, which increases a distance between the facesheets and increases the width of bridges 1353.

Figure 14:
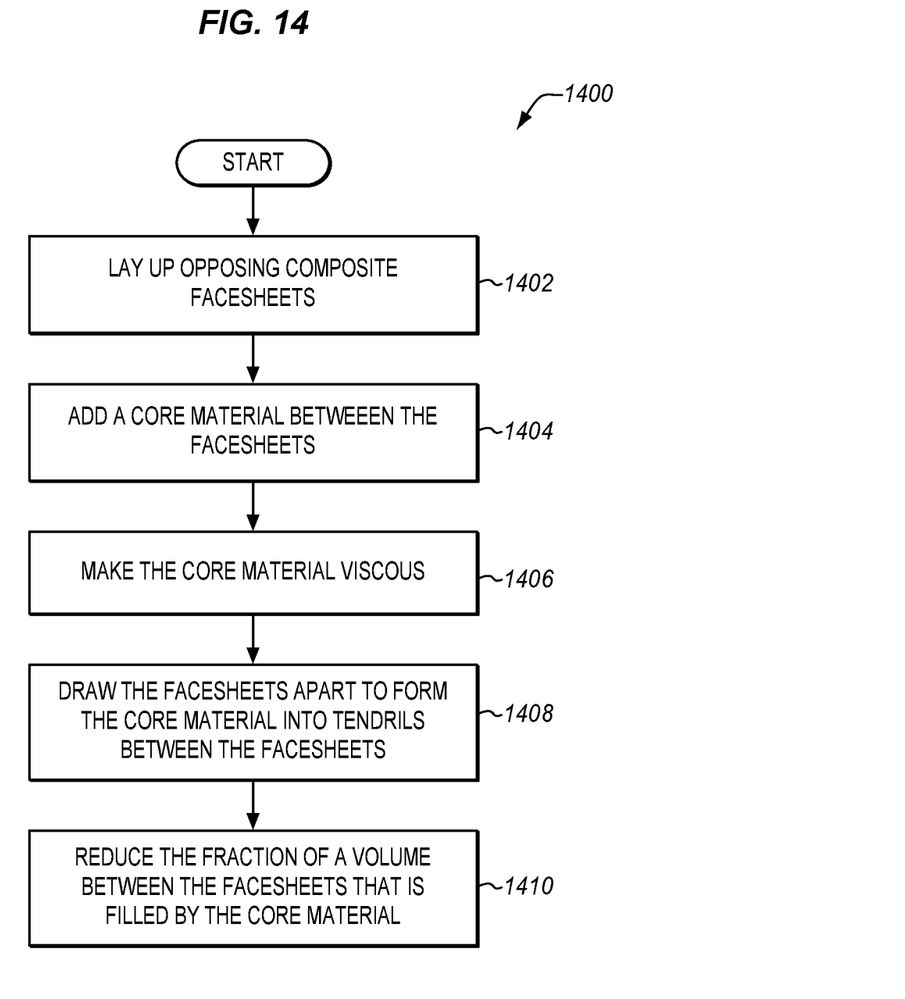
FIG. 14 is a flowchart illustrating a method for fabricating a composite part in an illustrative embodiment.

FIG. 14 is a flowchart illustrating a method for fabricating a composite part in an illustrative embodiment. According to FIG. 14, opposing composite facesheets (e.g., facesheet 110 and facesheet 120) are laid-up (step 1402). A core material (e.g., resin 132) is added between the facesheets (step 1404). The core material is made viscous (e.g., by heating) (step 1406). The facesheets are drawn apart to form the core material into tendrils 130 between the facesheets (step 1408). This action reduces the fraction of a volume between the facesheets that is filled by the core material (step 1410).

Figure 15:
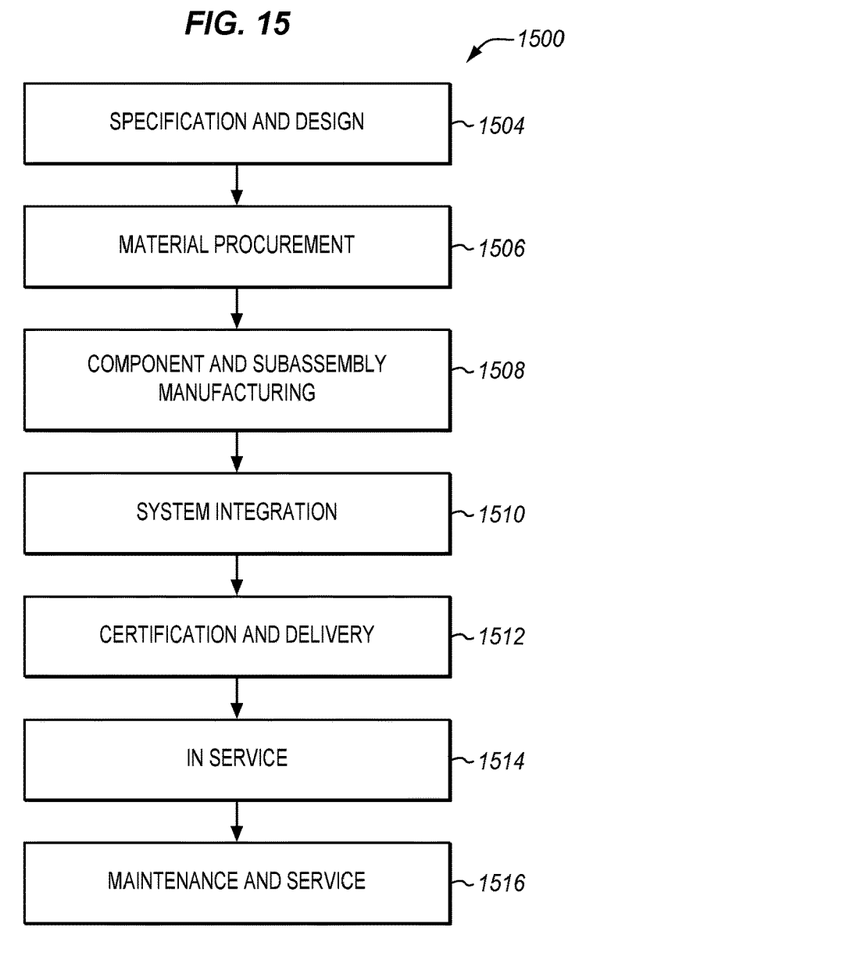
FIG. 15 is a flow diagram of aircraft production and service methodology in an illustrative embodiment.
Figure 16:
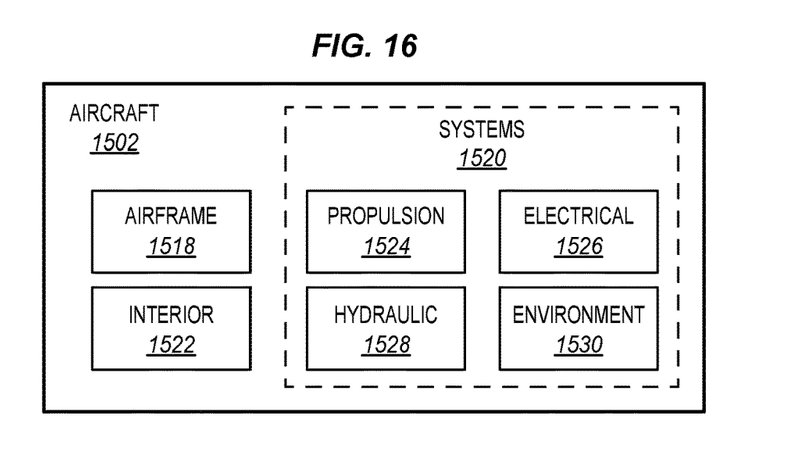
FIG. 16 is a block diagram of an aircraft in an illustrative embodiment.

Referring more particularly to the drawings, embodiments of the disclosure may be described in the context of an aircraft manufacturing and service method 1500 as shown in FIG. 15 and an aircraft 1502 as shown in FIG. 16. During pre-production, illustrative method 1500 may include specification and design 1504 of the aircraft 1502 and material procurement 1506. During production, component and subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine maintenance and service 1516 (which may also include modification, reconfiguration, refurbishment, and so on). Apparatus and methods embodied herein may be employed during any one or more suitable stages of the production and service method 1500 (e.g., specification and design 1504, material procurement 1506, component and subassembly manufacturing 1508, system integration 1510, certification and delivery 1512, service 1514, maintenance and service 1516) and/or any suitable component of aircraft 1502 (e.g., airframe 1518, systems 1520, interior 1522, propulsion 1524, electrical 1526, hydraulic 1528, environmental 1530).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1502 produced by illustrative method 1500 may include an airframe 1518 with a plurality of systems 1520 and an interior 1522. Examples of high-level systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

As already mentioned above, apparatus and methods embodied herein may be employed during any one or more of the stages of the production and service method 1500. For example, components or subassemblies corresponding to production stage 1508 may be fabricated or manufactured in a manner similar to components or subassemblies produced while the aircraft 1502 is in service. Also, one or more apparatus embodiments, method embodiments, or a combination thereof may be utilized during the production stages 1508 and 1510, for example, by substantially expediting assembly of or reducing the cost of an aircraft 1502. Similarly, one or more of apparatus embodiments, method embodiments, or a combination thereof may be utilized while the aircraft 1502 is in service, for example and without limitation, to maintenance and service 1516. For example, the techniques and systems described herein may be used for steps 1506, 1508, 1510, 1514, and/or 1516, and/or may be used for airframe 1518 and/or interior 1522. These techniques and systems may even be utilized for systems 1520, including for example propulsion 1524, electrical 1526, hydraulic 1528, and/or environmental 1530.

In one embodiment, a composite part comprises a portion of airframe 1518, and is manufactured during component and subassembly manufacturing 1508. The part may then be assembled into an aircraft in system integration 1510, and then be utilized in service 1514 until wear renders the part unusable. Then, in maintenance and service 1516, the part may be discarded and replaced with a newly manufactured part. Inventive components and methods may be utilized throughout component and subassembly manufacturing 1508 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method of forming a composite part comprising:
 disposing composite facesheets apart from each other by a distance;
 placing a solid charge of viscous material between the facesheets;
 heating the solid charge of viscous material until the solid charge enters a viscous phase;
 applying vacuum that secures the facesheets, and causes an increase in the distance between the facesheets, thereby reducing a percentage of volume between the facesheets that is occupied by the viscous material; and wherein the vacuum also concurrently forms the facesheets such that a shape of each of the facesheets is altered as the distance between the facesheets increases.

2. The method of claim 1 wherein:
the shape of at least one of the facesheets comprises a portion of an airfoil shape after being altered.

3. The method of claim 1 wherein:
increasing the distance between the facesheets comprises applying suction to a volume of an enclosed tool in which the facesheets are disposed, via vacuum ports.

4. The method of claim 1 wherein:
increasing the distance between the facesheets comprises supplying air between the facesheets.

5. The method of claim 1 further comprising:
solidifying the viscous material, wherein:
forming the facesheets is performed before the viscous material is solidified.

6. The method of claim 1 further comprising:
solidifying the viscous material, wherein:
the viscous material comprises a thermoset resin; and
solidifying comprises heating the viscous material to a curing temperature.

7. The method of claim 1 further comprising:
increasing an amount of empty volume between the facesheets when increasing the distance between the facesheets, by forcing air between the facesheets.

8. The method of claim 1 further comprising:
applying a closed cell foam between the facesheets after the facesheets and the viscous material have been solidified into an integral composite part.

9. A method comprising:
placing a solid charge of viscous material in contact with a first surface of a first facesheet;
placing the solid charge of viscous material in contact with a second surface of a second facesheet that faces the first surface such that the solid charge of viscous material is sandwiched between the first facesheet and the second facesheet;
heating the solid charge of viscous material until the solid charge enters a viscous phase;
drawing the second surface from the first surface in a direction away from the first surface, thereby reducing a percentage of volume between the first facesheet and the second facesheet that is occupied by the viscous material; and
concurrently securing and forming the facesheets via vacuum such that a shape of each of the facesheets is altered, wherein the forming causes an increase in the distance between the facesheets.

10. The method of claim 9 further comprising:
solidifying the viscous material, wherein:
the viscous material comprises a thermoset resin; and
solidifying the viscous material comprises heating the thermoset resin to a curing temperature.

11. The method of claim 9 further comprising:
solidifying the viscous material, wherein:
the viscous material comprises a thermoplastic resin; and
solidifying the viscous material comprises cooling the thermoplastic resin to a solid state.

12. The method of claim 9 wherein:
the first facesheet and the second facesheet each comprise a laminate of uncured Carbon Fiber Reinforced Polymer (CFRP); and
the method further comprises securing the first facesheet to a first part via vacuum, and securing the second facesheet to a second part via vacuum.

13. The method of claim 9 wherein:
drawing the second surface away from the first surface causes the viscous material to occupy at least ten percent of a volume between the first facesheet and the second facesheet.

14. The method of claim 9 wherein:
drawing the second surface from the first surface comprises displacing the second surface no more than two inches from the first surface.

15. The method of claim 9 further comprising:
solidifying the viscous material, wherein:
the viscous material comprises a molten metal; and
solidifying the viscous material comprises cooling the molten metal.

16. The method of claim 9 further comprising:
applying a material to a volume between the first facesheet and the second facesheet after the viscous material has solidified.

17. A method comprising:
laying up opposing composite facesheets;
adding a solid charge of core material between the facesheets;
making the solid charge of core material into viscous core material;
forming the facesheets such that a shape of each of the facesheets is altered; and
drawing the facesheets apart to form the viscous core material into multiple tendrils between the facesheets, wherein the forming of the facesheets and the drawing of the facesheets apart are performed concurrently via a vacuum.

18. The method of claim 17 wherein:
drawing the facesheets apart comprises supplying air between the facesheets.

19. The method of claim 17 further comprising:
reducing a fraction of a volume between the facesheets that is filled by the viscous core material while drawing the facesheets apart.

20. The method of claim 17 wherein:
the viscous core material comprises a thermoplastic resin.

21. A method of forming a composite part, the method comprising:
disposing composite facesheets apart from each other by a distance;
placing a viscous material between the facesheets;
heating the viscous material until the viscous material enters a viscous phase; and
forming a core between the facesheets with the viscous material linking the facesheets, wherein the forming is performed as vacuum secures the facesheets, draws the facesheets apart, and alters a shape of each of the facesheets, thereby forming the viscous material into multiple tendrils between the facesheets.

22. A method of forming a composite part, the method comprising:
disposing composite facesheets apart from each other by a distance;
placing a viscous material between the facesheets;
heating the viscous material until the viscous material enters a viscous phase; and
increasing the distance between the facesheets by altering a shape of each of the facesheets via vacuum that secures the facesheets and draws the facesheets apart, thereby reducing a percentage of volume between the facesheets that is occupied by the viscous material and forming a core of the viscous material between the facesheets.

* * * * *